US008719085B2

(12) United States Patent
Sullivan

(10) Patent No.: US 8,719,085 B2
(45) Date of Patent: *May 6, 2014

(54) SYSTEM AND METHOD FOR ADMINISTERING A BROKERAGE REBATE CARD PROGRAM

(75) Inventor: Kevin M. Sullivan, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2355 days.

This patent is subject to a terminal disclaimer.

(21) Appl. No.: 11/327,356

(22) Filed: Jan. 9, 2006

(65) Prior Publication Data
US 2006/0111980 A1 May 25, 2006

Related U.S. Application Data

(63) Continuation of application No. 09/761,763, filed on Jan. 18, 2001, now Pat. No. 6,985,873.

(51) Int. Cl.
G06Q 30/02 (2012.01)
G06Q 40/06 (2012.01)

(52) U.S. Cl.
USPC .................. 705/14.25; 705/14.27; 705/14.33; 705/39

(58) Field of Classification Search
CPC ... G06Q 40/04; G06Q 40/06; G06Q 30/0224; G06Q 30/0226; G06Q 30/0233
USPC ...................... 705/14.25, 14.27, 14.33, 35, 39
See application file for complete search history.

(56) References Cited

U.S. PATENT DOCUMENTS

| 3,634,669 | A | 1/1972 | Soumas et al. |
| 3,946,206 | A | 3/1976 | Darjany |
| 4,047,033 | A | 9/1977 | Malmberg et al. |
| 4,465,206 | A | 8/1984 | Sorel et al. |
| 4,545,838 | A | 10/1985 | Minkus et al. |
| 4,582,985 | A | 4/1986 | Lofberg |

(Continued)

FOREIGN PATENT DOCUMENTS

| CA | 2293321 | 6/1998 |
| EP | 959440 | 11/1999 |

(Continued)

OTHER PUBLICATIONS

"The Merrill Lynch CMA = Big Dinosaur", opinion piece by "Almighty", published at www.epinions.com and downloaded Feb. 8, 2011.*

(Continued)

Primary Examiner — Donald L. Champagne
(74) Attorney, Agent, or Firm — Goodwin Procter, LLP

(57) ABSTRACT

A technique for administering a rebate program includes logic for generating rebate information based the purchase of goods and/or services using a card instrument. The technique further includes logic for applying a rebate, based on the rebate information, to fund at least part of a transaction performed by an brokerage service. In one embodiment, the brokerage service charges a fee to perform the transaction. In this case, the rebate is used to fund at least part of the transaction fee. The rebate therefore entitles the cardholder to perform a transaction free of charge. The rebate thus is converted to one or more "free transactions," and in a more specific application, one or more "free trades."

20 Claims, 8 Drawing Sheets

(56) References Cited

U.S. PATENT DOCUMENTS

| | | |
|---|---|---|
| 4,614,861 A | 9/1986 | Pavlov et al. |
| 4,634,845 A | 1/1987 | Riley et al. |
| 4,689,478 A | 8/1987 | Hale et al. |
| 4,700,055 A | 10/1987 | Kashkashian, Jr. |
| 4,746,787 A | 5/1988 | Okada et al. |
| 4,750,119 A | 6/1988 | Robertson et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Kight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark et al. |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |

(56) References Cited

U.S. PATENT DOCUMENTS

| | | |
|---|---|---|
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,733 A | 8/1998 | Jachimowicz et al. |
| 5,794,207 A | 8/1998 | Walker |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,905,246 A | 5/1999 | Fajkowski |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,963,648 A | 10/1999 | Rosen |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,026,370 A | 2/2000 | Jermyn |
| 6,029,139 A | 2/2000 | Cunningham et al. |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,115,458 A | 9/2000 | Taskett |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,195,644 B1 | 2/2001 | Bowie |
| 6,202,053 B1 | 3/2001 | Christiansen et al. |
| RE37,122 E | 4/2001 | Levine et al. |
| 6,227,447 B1 | 5/2001 | Campisano |

(56) References Cited

U.S. PATENT DOCUMENTS

| | | |
|---|---|---|
| 6,243,688 B1 | 6/2001 | Kalina |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,336,099 B1 | 1/2002 | Barnett et al. |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,761 B1 | 8/2003 | Katis |
| 6,609,111 B1 | 8/2003 | Bell |
| 6,687,222 B1 | 8/2003 | Mittal et al. |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,675,127 B2 | 1/2004 | LaBlanc et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 | 4/2005 | Burke |
| 6,895,386 B1 * | 5/2005 | Bachman et al. .......... 705/14.13 |
| 6,901,372 B1 | 5/2005 | Helzerman |
| 7,006,992 B1 | 2/2006 | Packwood |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143703 A1 | 10/2002 | Razvan et al. |
| 2002/0147662 A1 | 10/2002 | Anderson |
| 2002/0165820 A1 | 11/2002 | Anvekar et al. |
| 2002/0174016 A1 | 11/2002 | Cuervo |
| 2003/0004828 A1 | 1/2003 | Epstein |
| 2003/0023549 A1 | 1/2003 | Armes et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0046249 A1 | 3/2003 | Wu |
| 2003/0053609 A1 | 3/2003 | Risafi et al. |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0243498 A1 | 12/2004 | Duke |
| 2005/0021400 A1 | 1/2005 | Postrel |
| 2005/0027649 A1 | 2/2005 | Cech |
| 2005/0071230 A1 | 3/2005 | Mankoff |
| 2005/0075932 A1 | 4/2005 | Mankoff |
| 2005/0091138 A1 | 4/2005 | Awatsu |
| 2005/0171898 A1 | 8/2005 | Bishop et al. |
| 2006/0111980 A1 * | 5/2006 | Sullivan .................... 705/14 |

FOREIGN PATENT DOCUMENTS

| | | |
|---|---|---|
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

SONG, A Card That Asks for ID, TIme Magazine, Apr. 12, 2004, 1 page.

A Store Card Issuer Looks for Lift from Electronic Gift Certificates, Credit Card News, Feb. 1, 1995, 2 pages.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

(56) References Cited

OTHER PUBLICATIONS

Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
Card Flash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.

(56) References Cited

OTHER PUBLICATIONS

SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMs?, Computerworld, printed Feb. 23, 2001, 3 pages.
Meridian Award Cards, JA8251.
Meridian—the leader in card marketing, JA8343.
Incenticard, JA8329.
Card Based Award Systems, JA8309.
Meridicard vs. Debit Cards, JA7917.
Award Card Comparision, JA7922.
How is it Different?, JA8331.

* cited by examiner

FIG. 9

| transaction details | | | | |
|---|---|---|---|---|
| Card Account No. ZZZZ-ZZZZ-ZZ | Previous Balance $XXXX.XX | New Balance $XXXX.XX | Minimum Amount Due on xx/xx/xx $XX.XX | |
| Date | Transaction Code | Vendor | Amount | |
| X | XXX | A | $XXX.XX | |
| X | XXX | B | $XX.XX | |
| . | . | . | . | |
| . | . | . | . | |
| X | XXX | C | $XX.XX Total this Month $XXX.XX | |

| rebate information | | | | |
|---|---|---|---|---|
| Brokerage Acct No. YYYY-YYYY-YY | Card Usage for Month: $XXX.XX | Usage Rebate for Month $X.XX | Total Rebate Value $XX.XX | Rebate Payout Date xx/xx/xx |

FIG. 10

| transaction details | | | | |
|---|---|---|---|---|
| Card Account No. YYYY-YYYY-YY | Previous Account Balance $XXXX.XX | Deposits $XXX.XX | New Account Balance $XXXX.XX | |
| Date | Transaction Type/Code | Transaction Details (e.g, No. of Shares) | Amount | Transaction Fees |
| X | XXX | XXX | $XXX.XX | $X.XX |
| X | XXX | XXX | $XX.XX | $X.XX |
| . | . | . | . | . |
| . | . | . | . | . |
| X | XXX | XXX | $XX.XX Total this Month $XXX.XX | $X.XX Total this Month $XX.XX |

| rebate information | | | | | |
|---|---|---|---|---|---|
| Card Acct No. ZZZZ-ZZZZ-ZZ | Last Rebate Added to Free Trade Account xx/xx/xxxx | Value of Last Rebate $XX.XX | Previous Free Trade Account Total $XX.XX | Amount Used This Month $X.XX | Current Free Trade Account Balance $XX.XX |

# SYSTEM AND METHOD FOR ADMINISTERING A BROKERAGE REBATE CARD PROGRAM

RELATED APPLICATIONS

This patent application is a Continuation of U.S. patent application Ser. No. 09/761,763, filed on Jan. 18, 2001 now U.S. Pat. No. 6,985,873 entitled "System and Method for Administering A Brokerage Rebate Card Program", which is hereby incorporated by reference in its entirety.

BACKGROUND OF THE INVENTION

The present invention relates generally to a system and method for administering a rebate program. More particularly, the present invention is directed to a system and method for administering a reward-based marketing program by determining rebate information based on purchases made using a card payment instrument, and for applying the rebate information to fund at least part of a brokerage transaction.

Some businesses offer rebates to loyal customers based on their respective net purchases over a span of time. For instance, some airlines offer customers "free" mileage based on respective total mileage amounts that customers have accrued over a span of time (thus providing a type of "frequency-based" reward program). Other businesses have adopted similar models. For instance, some stores (such as supermarkets) monitor the purchases of customers and then provide various rewards to the customers based on the volume and/or composition of the customers' purchases. Store-based reward programs typically identify the customers at the checkout stand and then post the customers' purchases to respective customer accounts.

Financial card systems may also offer rebates. For instance, the known DISCOVER® card provides a relatively small annual cash rebate to cardholders based on the aggregate value of the cardholders' purchases in the course of the year. The card provider distributes the rebate via a check or like means of payment (such as discount coupons). Upon receipt, the cardholders are free to spend the rebates in any manner that they deem appropriate.

The above type of card-based rebate program may appear attractive to some cardholders. However, this credit card rebate program may not be effective in establishing a lasting association in the minds of the cardholders between the rebates and the card provider. Further, the distribution of rebates directly to the cardholders (without any conditions placed on the use of the rebates) may be an ineffective technique in "steering" the cardholders' behavior toward desired ends. Thus, for instance, the above-described rebate program cannot be used to entice cardholders to utilize the services of third party providers (such as other financial institutions associated with the card provider). In this sense, the above-described program may be regarded as "one-dimensional."

The patent literature describes more complex rebate programs. For instance, U.S. Pat. No. 6,105,865 discloses the transfer of card-based rebates to a participant's trust fund account. U.S. Pat. No. 6,070,153 discloses the transfer of card-based rebates to various types of retirement accounts, college saving accounts, 401(K) profit sharing plans, etc. U.S. Pat. No. 5,787,404 discloses transferring card-based rebates to a long term investment account with a financial institution (such as a bank, savings and loan association, credit union, broker-dealer, insurance company, etc.). U.S. Pat. No. 5,970,480 discloses converting card-based rebates into ownership interests in investment instruments, such as mutual funds, bonds, insurance investments, or an annuities.

The above-described programs may have a number of drawbacks. For instance, the programs may fail to encourage cardholders to actively interact with the third party investment provider. For example, a cardholder may lose interest in the investment program because the rebates are typically small, and therefore may be perceived as having only a negligible impact on the investment as a whole. A cardholder may also become disinterested in the program because the investments are perceived to offer no immediate benefits (e.g., the pay out of a long-term investment may be perceived as too "remote"). Further, a cardholder may lose interest in the program because the interface for interacting with the investment provider is perceived as cumbersome or otherwise ineffective. Such lack of interest in the program may reduce revenue generated by the program for both the card provider and the investment provider. This lack of interest may also prevent cardholders from taking appropriate action to make their investments more effective (e.g., by eliminating unproductive assets).

Known rebate programs may also suffer from additional unspecified shortcomings.

There is accordingly a need to provide a more effective card-based rebate program.

SUMMARY OF THE INVENTION

The present invention solves the above-identified problems in the art, as well as other unidentified problems.

One exemplary aspect of the invention pertains to a system and method for administering a rebate program. The system includes logic for generating rebate information based on at least one purchase of goods or services using a card payment vehicle (such as a credit card, debit card, stored-value card, pre-paid card, or other type of card instrument). The system further includes logic for applying a rebate, based on the rebate information, to fund at least part of a transaction performed using a brokerage system (such as a "face-to-face" brokerage system, an "electronic" brokerage system, or other type of system that facilitates the trading or management of financial assets). In one embodiment, the brokerage system charges a fee to perform the transaction (such as a securities purchase or sale). In this case, the rebate is used to fund at least part of the transaction fee. The rebate therefore provides the cardholder with a "free" or discounted transaction, and in a more specific application, a "free trade."

Another exemplary aspect of the system includes a card provider system and a brokerage system. The card provider system includes: a card instrument account assigned to a cardholder that identifies purchases made by the cardholder using a card instrument; logic for processing a purchase made by the cardholder based on use of the card instrument; and logic for determining rebate information based on the purchase made using the card. The brokerage system includes: a transaction account assigned to the cardholder that identifies transactions made by the cardholder using the brokerage system; logic for receiving instructions from the cardholder (or on behalf of the cardholder) that directs the brokerage system to perform a transaction and to properly account for the transaction; logic for processing the transaction; and logic for applying a rebate to fund at least part of the transaction, wherein the rebate is based on the rebate information. The brokerage system may facilitate the transfer and/or management of financial assets, or may perform other financial-related services on behalf of its clients.
}

According to one exemplary advantage, the system and method may encourage subscribers associated with the card provider and/or brokerage service to remain loyal to these entities (e.g., by maintaining their accounts with these entities). The system and method may also encourage increased usage of the card for making payments, and/or increased usage of the brokerage service.

According to another exemplary advantage, the system and method may allow a card provider to more effectively "steer" a cardholder's behavior toward the use of third party services, such as a brokerage service.

According to another advantage, the availability of a "free trade" may serve as a powerful incentive to motivate cardholders to actively engage and interact with the brokerage service, even though the amount of the rebate may be relatively small. The "free trades" may also encourage cardholders to make more purchases using the card. These factors may result in increased revenue for both the card provider and the brokerage service.

According to another advantage, the "free trades" may allow the cardholders to become more attentive to their respective brokerage accounts (e.g., by selling unproductive investments, visiting the brokerage system's website, performing research to keep abreast of relevant information concerning their assets, etc.). At the same time, the rebates preferably remain relatively small. Hence, the availability of the rebates should not encourage reckless investment by the cardholders (e.g., with respect to purchases or sales of securities).

According to another advantage, the cardholders may directly interact with the brokerage service via a wide-area network, such as the Internet. Access to the network may be through hard-wired lines or wireless communication routes, or some other communication means. The immediacy and directness of this access mechanism may further encourage cardholders to actively participate in the rebate program.

According to another advantage, the rebates may be funded by both the card provider and the brokerage service. This allows the program designers to tailor the rebate program to suit different business environments and contractual arrangements.

Additional features and advantages of the invention will be set forth in the description that follows.

BRIEF DESCRIPTION OF THE DRAWINGS

The present invention can be understood more completely by reading the following Detailed Description of exemplary embodiments, in conjunction with the accompanying drawings, in which:

FIG. 9 shows an exemplary statement provided by the card provider system of FIG. 1, which communicates information concerning the rebates that a cardholder is entitled to; and FIG. 10 shows an exemplary statement provided by the brokerage system of FIG. 1, which communicates information concerning the rebates that a cardholder is entitled to.

DETAILED DESCRIPTION OF THE INVENTION

Figure 1:
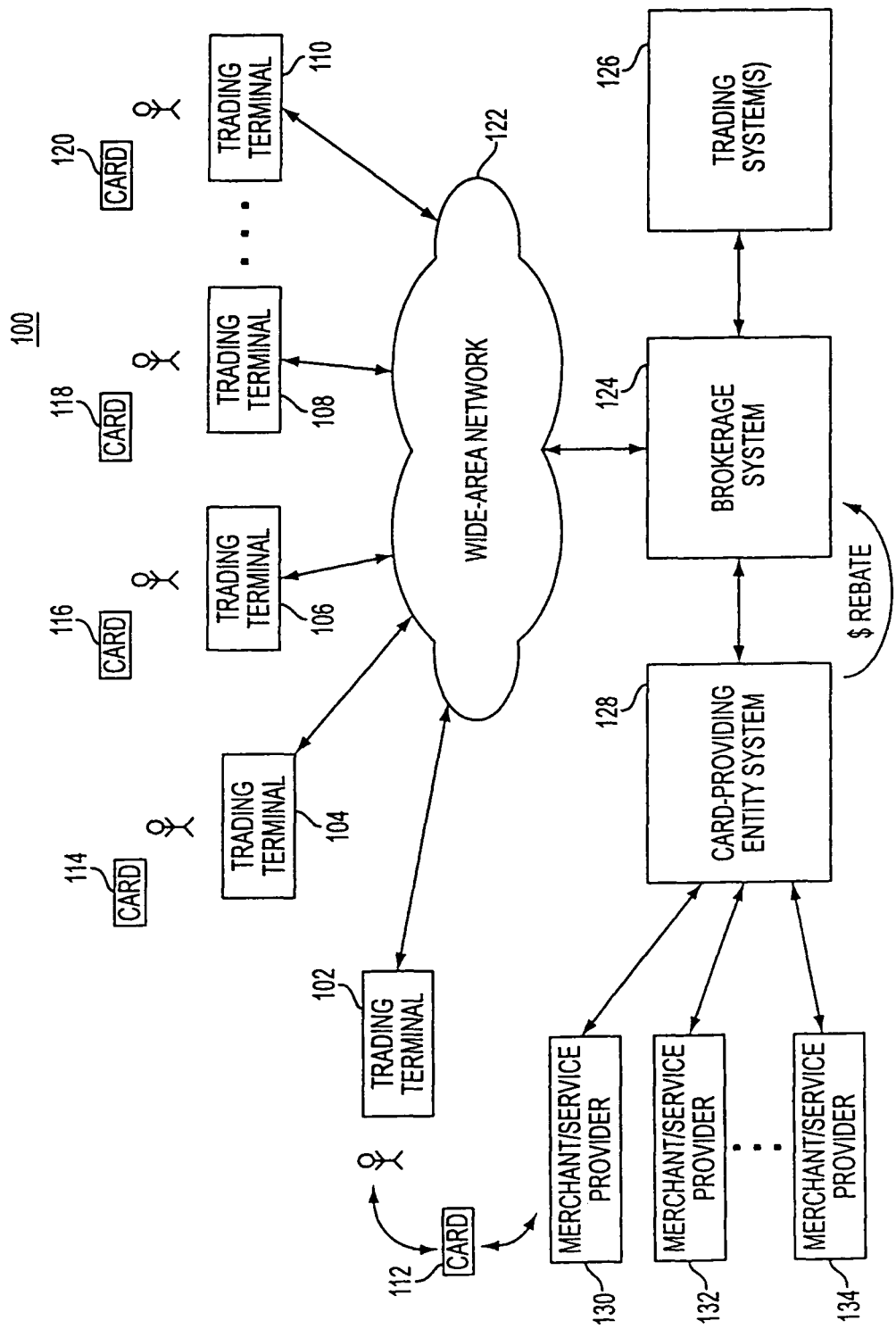
FIG. 1 shows an exemplary system for implementing the invention.

The present invention is directed to a system and method for generating rebates through the use of a card instrument to purchase goods and services, and then using the rebates to fund transactions made using a brokerage system. The term "card instrument" encompasses any type of token used to purchase any type of goods or services. Exemplary kinds of cards may include credit cards, multi-featured credit cards, debit cards, bank cards, stored value cards, smart cards, various types of co-branded cards, or other types of payment instruments. For instance, the card instrument may comprise a conventional plastic credit card including a magnetic stripe. The stripe contains cardholder ID information, account information, etc. Alternatively, the card may merely comprise information retained in any memory (including the human memory) that a holder may use to reference a value-bearing account. Still alternatively, the card may comprise account-related information that can be reproduced at the time of a transaction (or, otherwise, on demand). For brevity, the ensuing discussion refers to the card instruments as simply "cards."

The term "card provider" is likewise intended to encompass various types of providers. In a typical arrangement, known companies (such as VISA®, MASTERCARD®, AMERICAN EXPRESS®, etc.) act alone or in association with financial institutions (such as banks and/or other business entities) to supply cards to credit-worthy cardholders, and to subsequently administer credit and payment services for the benefit of the cardholders. In this case, the term "card provider" may represent any entity or combination of entities having a role in furnishing cards to the cardholders and in subsequently administering the services associated with the cards.

The term "brokerage system" encompasses any type of system that administers any type of brokerage service on behalf of its customers. Some exemplary brokerage systems may make financial investments on behalf of their customers. Other exemplary brokerage systems may empower their customers to directly trade and manage their own financial assets. Other categories of brokerage services include traditional "face-to-face" brokerage services, full-service type brokerage services, discount brokerage services, brokerage systems that primarily rely on telephonically communicated instructions from customers, "electronic" brokerage services (such a client-accessible Internet-based brokerage services), as well as other types of brokerage services.

While many brokerage applications are envisioned, to simplify and facilitate explanation, "electronic" brokerage systems are emphasized in the following discussion. In one embodiment, such systems empower cardholders to electronically access the brokerage system via a wide-area network (such as the Internet) and perform investment-related transactions. More specifically, a typical electronic brokerage system may enable subscribing cardholders to buy and sell shares of stock, mutual funds, bonds, etc. The brokerage system may also enable subscribing cardholders to perform a wide variety of tracking, planning, and analysis tasks pertaining to investments. In a typical application, the brokerage system requires potential subscribers to first establish and fund an account with the brokerage system. The system then debits the account by an appropriate amount when the subscriber purchases investment assets (or performs other cost-incurring transactions). The brokerage system may also assess a transaction fee when a subscriber makes a transaction using its services. For instance, the brokerage system may assess a fee when the subscriber trades an asset or receives advice from the service (where different levels of access to information may incur different charges). One known brokerage service is E*TRADE. The E*TRADE service may be accessed over the Internet at <<http://etrade.com>>.

Other electronic-based brokerage systems are used by brokerage agents to trade and manage assets on behalf of the agents' customers (e.g., based on instructions or authorization provided by the customers).

FIG. 1 provides an overview of one exemplary system 100 that can be used to implement the present invention. The system includes a card provider system 128 that provides a number of card instruments (e.g., cards 112, 114, 116, 118, and 120) to qualifying cardholders, and subsequently administers the card-based rebate program of the present invention. From a logical standpoint, card provider system 128 may include any system for carrying out the card-related processing functions of the rebate program, such as receiving and processing applications from potential subscribers, maintaining account data, processing transactions, and interfacing with the various entities (such as cardholders, merchants, service providers, and brokerage systems, etc.). From a physical standpoint, equipment associated with the card provider system 128 may be distributed over plural sites which may be administered by separate business entities. Alternatively, the technology associated with the card provider system 128 may be located at a single physical site and/or be administered by a single business entity.

The card provider system 128 interacts with plural merchants or service providers, represented generically as "merchant/service providers" 130, 132, and 134. The merchant/service providers supply a broad range of goods and/or services that may be purchased by cardholders using their cards. For instance, FIG. 1 shows an exemplary cardholder interacting with merchant/service provider 130 using his or her card 112. The cardholder may physically present the card at a merchant site where it is physically read in a conventional fashion (e.g., by swiping the card through a carding reading apparatus). Alternatively, a cardholder may purchase goods or services by simply providing identifying information from his or her card to the merchant (e.g., by orally providing the information to a merchant over the telephone or like device, or by directly inputting this information to a merchant's computer system over a network or other communication means).

The system further includes plural exemplary terminals 102, 104, 106, 108 and 110 which are connected to a wide-area network 122. The wide-area network 122 may comprise any type of network, but preferably comprises a network that can be accessed using a variety of different types of devices from a variety of different locations. For instance, the wide-area network 122 may comprise the Internet, or like network. The terminals may comprise any type of general or special purpose computers, or other types of electronic devices (such as cellular telephones, Personal Digital Assistants, etc.). The terminals can access the brokerage system 124 via the network 122 by, for instance, inputting an address (e.g., web site address) associated with the brokerage system 124.

The brokerage system 124 may comprise any type of brokerage service that provides investment-related opportunities to customers. The system 124 may be implemented as any head-end system for interacting with terminals (such as a server type of head-end computer system operating on the World Wide Web or other wide-area network, a mainframe type of head-end computer, or other type of head-end architecture). Further, the brokerage provider system 124 can be implemented as a plurality of processing facilities distributed over plural physical sites, or may be implemented at a single site. In an alternative embodiment (not shown), cardholders may convey instructions to the brokerage system 124 through alternative means, such as via telephone, cellular phone, or other communication device. Brokerage personnel at the brokerage system 124 may then carry out the instructions in conventional fashion. In another embodiment, cardholders may convey their instructions directly to appropriate brokerage personnel by actually meeting with the brokerage personnel in a conventional "face-to-face" manner.

The card provider and the brokerage service may be related to each other according to various types of arrangements, such as a partnership arrangement, a joint-venture venture-type arrangement, a co-ownership-based arrangement, an affiliation-based arrangement, or some other type of arrangement.

In an alternative embodiment (not illustrated), a single system may be used to perform the functions associated with the card provider system 128 and the brokerage system 124. This single system may be implemented at a single general site. This single system may be operated by plural associated business entities or a single business entity.

The brokerage system 124 also interacts with one or more trading systems 126. The trading systems may comprise any type of system in which investment assets may be bought and sold in a particular jurisdiction. For instance, the trading system may broadly represent any type of stock exchange system (or any combination of stock exchange systems) used to publicly trade assets on the open market.

Although not specifically illustrated, selected merchants and service providers may be connected to the wide-area network 122 (such as the Internet). This would allow cardholders to access the merchants and service providers over the network and make purchases over the network in a conventional fashion. The card provider system 128 may also provide connection to the network 128. This would allow cardholders to interact with the card provider system 128 over the network, e.g., to check on the status of accounts, transfer funds, initiate bill payments, or perform other types of transactions.

Figure 2:
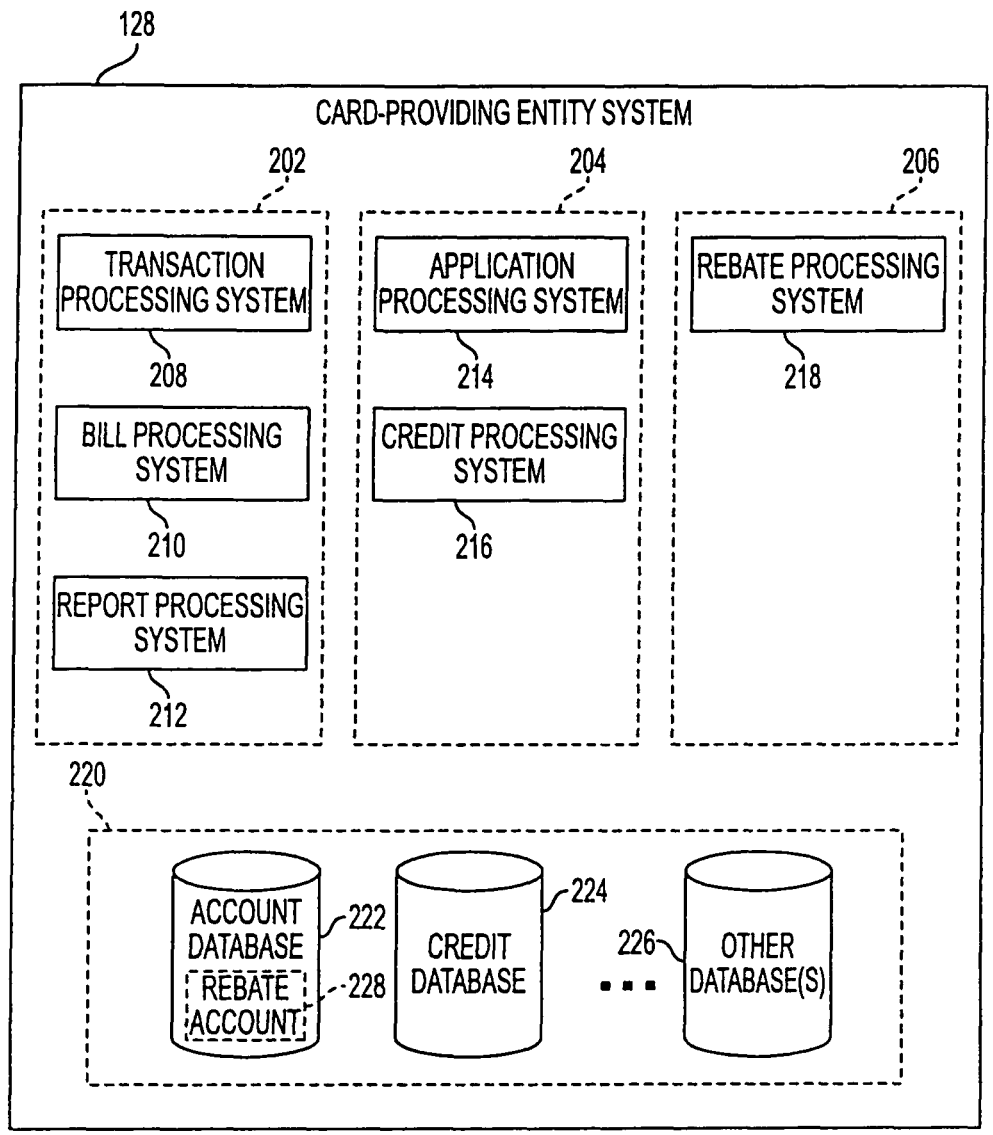
FIG. 2 shows an exemplary card provider system for use in the system of FIG. 1.

FIG. 2 illustrates further details of the card provider system 128. From a functional perspective, the card provider system 128 includes plural principal modules for administering the card-based services. Namely, the card provider system 128 includes a transaction module 202, an application module 204, and a rebate module 206.

The transaction module 202 includes a transaction processing system 208, bill processing system 210, and report processing system 212. The transaction processing system 210 interacts with the merchant/service providers when a cardholder makes a purchase using his or her card, and also handles all associated transaction logging and processing tasks. The bill processing system 210 generates periodic (e.g., monthly) statements for distribution to the cardholders. The statements may list the transactions made by respective cardholders in a given reporting interval. The report processing system 212 generates various internal reports used by personnel affiliated with the card provider system 128. The report processing system 212 may also generate other reports for the cardholders. More specifically, the report processing system 212 may generate customer reports on an annual basis (or upon special request) that summarize the customers' year-long transaction history.

The application module 204 includes application processing system 214 and credit processing system 216. The application processing system 214 handles various tasks associated with establishing a new account with a potential subscriber. The credit processing system 216 performs credit verification to determine the credit worthiness of the potential consumer/subscriber (which may involve access to information maintained by a credit bureau).

The rebate processing module 206 includes rebate processing system 218. This system performs all tasks associated with the administration of the rebate program, to be described in further detail below.

The card provider system 128 further includes data storage module 220 containing various databases. More specifically, the module 220 includes account database 222 which stores a number of accounts associated with respective cardholders. The account database 222 may store transaction details (regarding transactions made by the cardholders using their cards), credit limit information, outstanding balance information, etc. Database 222 may further include a storage area or storage field 228 that stores information pertaining to the rebates earned by the cardholders. This area or field is referred to generally as a "rebate account," or "free trades account."

The data storage module 220 further includes a database 224 for storing credit-related information pertaining to the subscribers. More specifically, database 224 stores information pertaining to the credit worthiness of cardholders (as well as potential cardholders). Such information enables the card provider system 128 to make an informed decision whether to accept or deny an applicant's request for membership in the card-based rebate program of the present invention.

Finally, the card provider system 128 may employ one or more additional storage databases 226 to suit the needs of specific applications. Generally, databases 222, 224, 226, etc. may be co-located at one site, or may be distributed, in whole or in part, over multiple sites.

Figure 3:
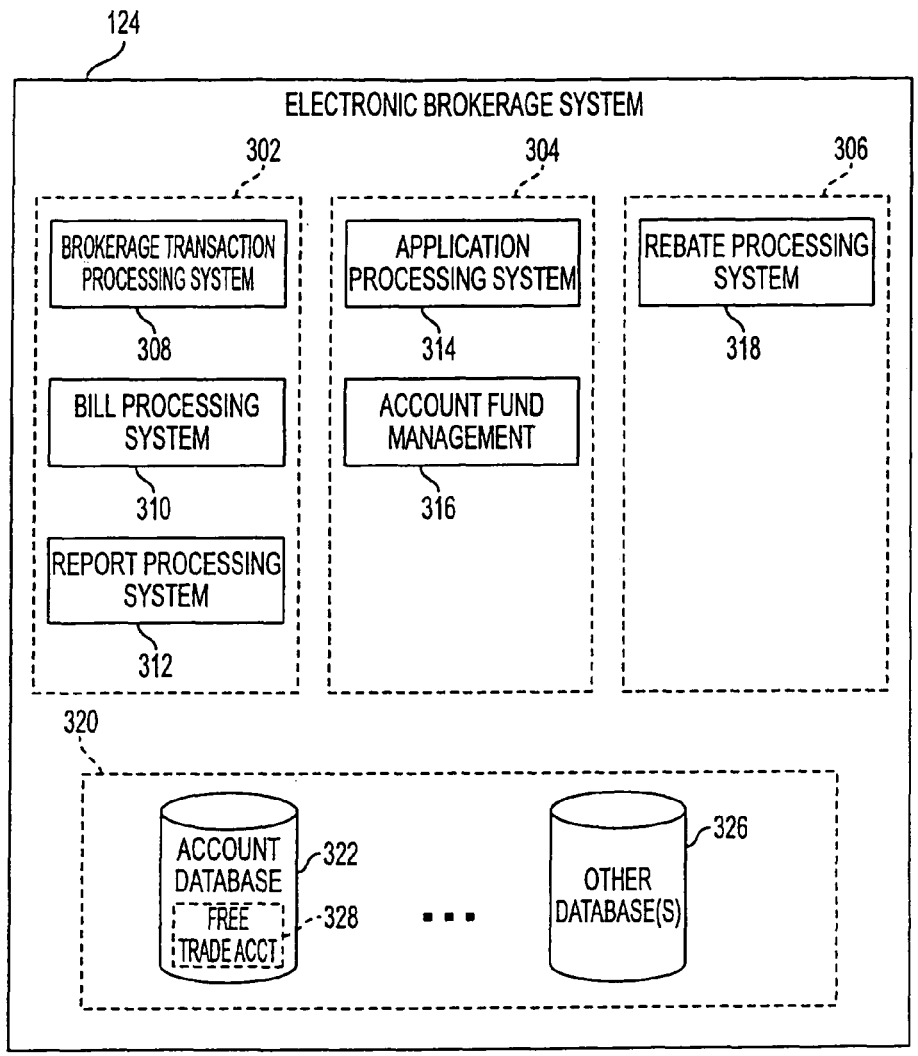
FIG. 3 shows an exemplary brokerage system for use in the system of FIG. 1.

FIG. 3 shows further details regarding the brokerage system 124. Generally, the brokerage system may include similar functional (e.g., logical) organization to the card provider system 128. More specifically, the brokerage system 124 includes a transaction module 302, application processing module 304, and rebate processing module 306.

Transaction module 302 includes a brokerage transaction processing system 308 for performing various trading and analysis functions. Module 302 further includes a bill processing system 310 for performing various billing functions, and report processing system 312 for performing various reporting functions related to investment account management.

Application module 304 includes an application processing system 314 for performing various functions involved when a potential subscriber applies to the brokerage service. The account fund management system 316 performs various functions associated with establishing and maintaining funds necessary to operate the cardholders' accounts.

The rebate processing module 306 includes rebate processing system 318. System 318 performs various functions associated with the administration of rebates. For instance, system 318 receives rebate information from the card provider system 128, and then coordinates the application of rebates to individual brokerage accounts based on the rebate information. System 318 also coordinates the debiting of the rebates when cardholders make transactions using the brokerage system 124.

The brokerage system 124 further includes a memory module 320 for storing various databases used in carrying out its functions. Notably, the brokerage system 124 includes an account database 322. The account database 322 stores various information concerning subscribers of the brokerage system 124, such as information which identifies the transactions made by the subscribers, funds allocated to the subscribers, billing information associated with the subscribers, etc. The account database 322 also includes a storage area or storage field 328 that contains information which identifies the rebates available to cardholders.

The brokerage system 124 may assess fees when its subscribers make transactions (e.g., stock purchases or sales). In one exemplary embodiment, the brokerage system 124 applies the rebates identified in the account 328 to cover the transaction fees assessed by the brokerage system 124. The transactions covered by the funds indicated in account 328 may therefore be regarded as "free," and hence the account itself may be denoted, as indicated, as a "free trade account." Alternatively, application of the rebates to the transaction fees may serve to discount one or more trades, but not entirely absorb the costs of such trades.

In alternative embodiments, the brokerage service may apply the rebates indicated in account 328 to help fund the actual purchase price of investments, e.g., to contribute toward payment of the purchased investment assets. In still another alternative embodiment, the brokerage system 124 enables the cardholder to specify the manner in which the rebates are to be applied. For instance, the cardholder may select whether he or she wants the rebates applied to cover only transaction fees, only investment purchase price costs, or a combination of transaction fees and purchase price costs. Still alternatively, the cardholder may specify that the rebates are only to be applied to specific kinds of transactions (that is, if the card provider and brokerage service agree to provide such an option).

Finally, the database module 320 may include one or more other databases 326 suitable to particular applications.

Figure 4:
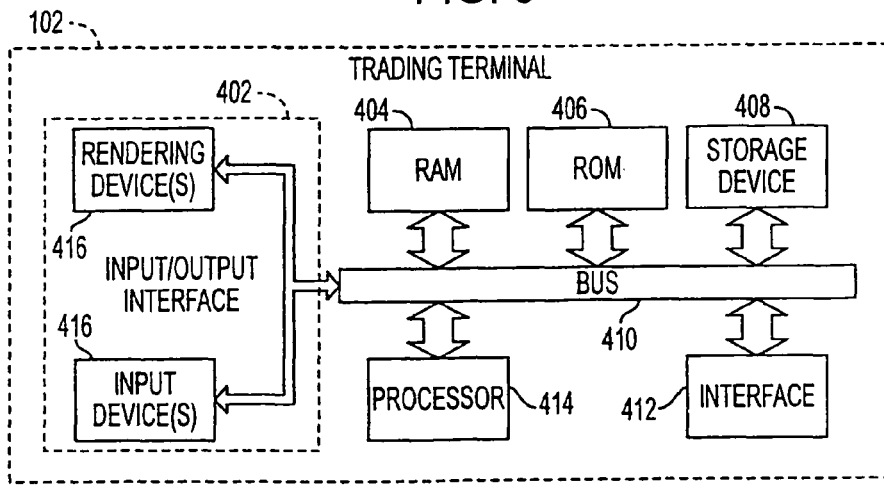
FIG. 4 shows an exemplary terminal for use in interacting with the brokerage system in the system of FIG. 1

FIG. 4 illustrates an exemplary trading terminal 102 that can be used to interact with the brokerage system 124. The terminal 102 shown in this figure represents a general purpose computer (e.g., a "personal computer"). It includes a bus 410 which connects conventional components, such as a logic processing unit 414 (e.g., a microprocessor), Random Access Memory (RAM) 404, Read Only Memory (ROM) 406, one or more storage devices (408), and an input/output interface 402. The input/output interface 402, in turn, includes one or more input devices (such as a keyboard, touch screen, graphical mouse device, etc.). The input/output device 402 further includes one or more rendering devices (such as a display, printer, etc.). Further, the terminal 102 includes a communication interface 412 (e.g., a modem or like device) for interacting with external network equipment.

The RAM memory 404, ROM memory 406, and/or storage device 408 may store computer code that enables the terminal 102 to interact with the brokerage system 124. Such programs may be downloaded from the brokerage system 124, or distributed to the terminal 102 by some other means. Depending on the selected implementation, brokerage processing functionality may be located mainly at the terminal 102, shared between the terminal 102 and the brokerage system 124, or located mainly at the brokerage system 124.

Figure 5:
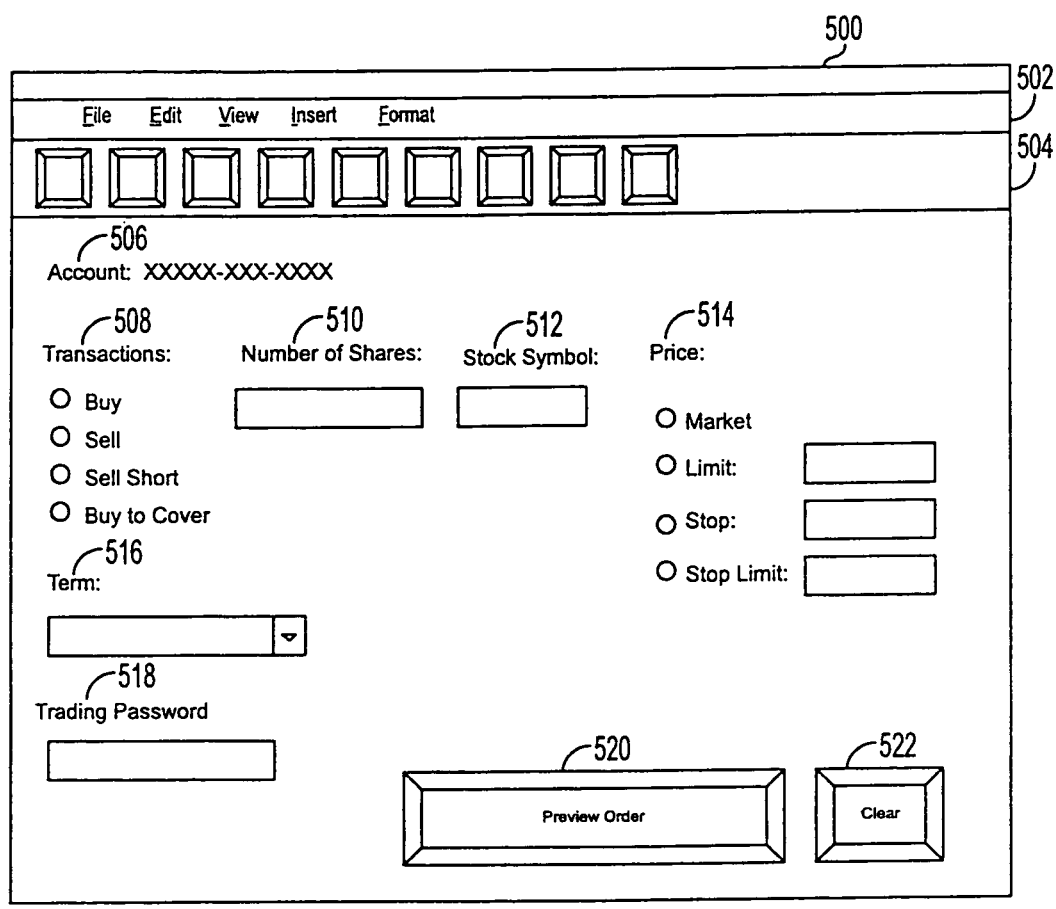
FIG. 5 shows one exemplary interface screen that may be displayed at the terminal shown in FIG. 4.

FIG. 5 presents an exemplary interface screen 500 that can be displayed at the rendering device 416 of any trading terminal. More specifically, interface screen 500 represents one exemplary screen within a series of interface screens (not shown). Screen 500 particularly allows a cardholder (or other user) to trade investment assets (e.g., stock).

The screen 500 includes conventional pull-down menu entries 502. The screen further includes navigation ions 504 for performing conventional navigation operations. The screen 500 further identifies the cardholder in field 506 by displaying a brokerage service account number associated with cardholder.

The screen 500 includes a transaction field 508 where a user specifies a transaction type. The transaction types include "Buy" (an order to buy a specific stock), "Sell" (an order to sell specific stock that the cardholder owns), "Sell Short" (an order to sell a specific stock that the cardholder does not own), or "Buy to Cover" (an order to buy back a stock that a cardholder previously sold short, thus closing out a short sale). The screen further includes a field 510 where a user enters the number of shares involved in the transaction. The screen further includes a field 512 where a user enters the symbol of the stock involved in the transaction.

A price field 514 prompts a user to select between "Market," "Limit," "Stop," and "Stop Limit." These entries pertain to well known options regarding price conditions placed on a transaction. For instance, a "Market" entry identifies an order to buy or sell the stock at the best price available when the order reaches a "market maker." The "Limit" entry refers to an order to buy or sell the stock at or above a cardholder specified price (which the cardholder enters in the box next to the "Limit" entry). The "Stop" entry pertains to an order to buy or sell the stock once it has traded at the price a cardholder specifies (which the cardholder enters in the box next to the "Stop" entry). A stop order becomes a market order when it reaches or exceeds the specified price, called the stop price. More specifically, a cardholder may place a "buy stop order" at a price above the current offering price, and a "sell stop order" at a price below the current bid price. Finally, the "Stop Limit" entry is like a stop order, but such an order becomes a limit order rather than a market order when the stock reaches the stop price.

The term field 518 enables a user to enter the terms of the transaction, such as "Good for Day," or "Good Until Canceled." The "Good for Day" condition requires that an order expire if it has not been executed either by the close of trading on the day it was entered. Alternatively, as the name suggests, a "Good Until Canceled" field designates an order that remains valid until canceled.

Field 518 prompts a cardholder to enter his or her trading password. Button 520 enables the cardholder to preview an order. Button 522 enables the cardholder to clear an order.

Screen 500 (or other account management screens, not shown) may also display information regarding the availability of rebates to cover the costs of making one or more transactions. Namely, the interface may apprise a user of the total amount of rebate funds available, the total number of free trades earned, the amount of funds spent in a particular session, or other rebate-related information.

Figure 6:
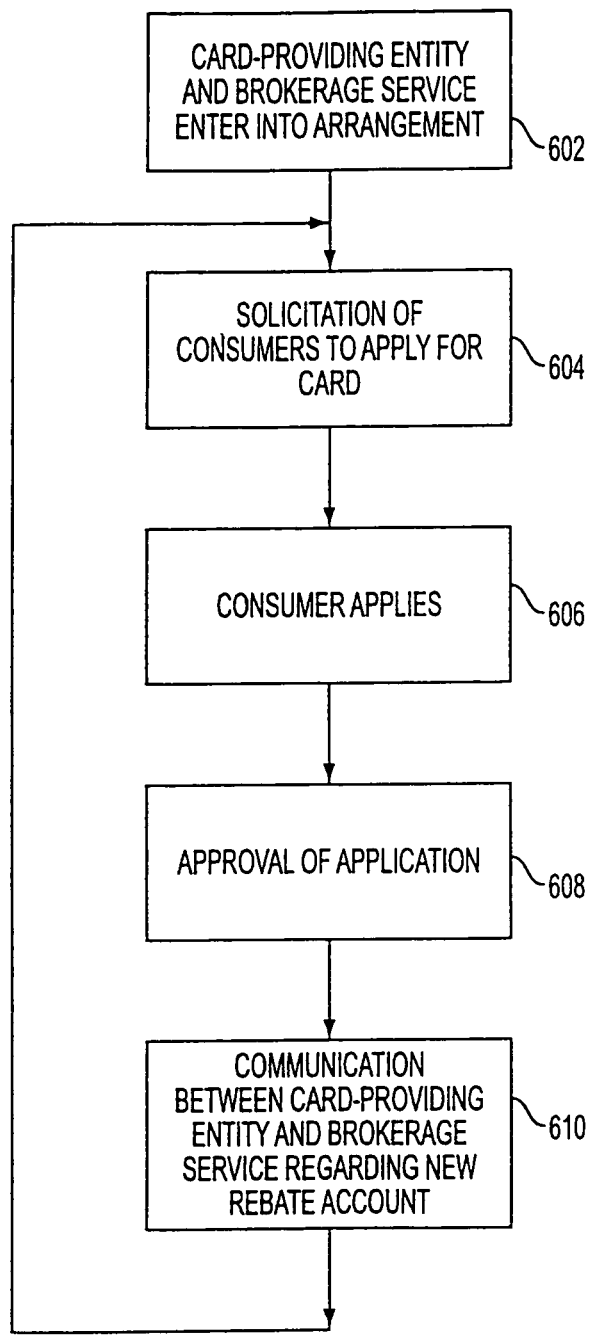
FIG. 6 shows one exemplary process for forming new accounts according to the present invention.

FIG. 6 illustrates exemplary processing involved in the formation of new accounts according to one exemplary embodiment. The process begins in step 602, where the card provider and brokerage service enter into an arrangement to implement a card-based rebate program (such as a "free trades" rebate program). The arrangement may comprise any type contractual agreement between the two entities, or may merely represent an informal business practice established between the two entities.

In an alternative embodiment (not shown), an arrangement between the card provider and brokerage service takes place later in the process. For example, a card provider may distribute rebate funds to a particular brokerage service at the request of an existing cardholder, even though there was no preexisting arrangement between the cardholder and that particular brokerage service. Allowing the cardholders to select third party providers after their rebates have been earned may provide an effective means for dynamically forming partnerships with third party providers.

In step 604, the card provider and/or the brokerage service solicit consumers to apply for the rebate program. The solicitation may be directed at consumers that have no prior business relationship with either the card provider or brokerage service. Alternatively, the solicitation may be directed at consumers who are currently subscribers of either the card provider system 128 or the brokerage system 124, but are not currently enrolled in the rebate program. For instance, the card provider may send the cardholder monthly statements that list "free trade" rebates earned by the cardholder that may be channeled to an brokerage service, upon the cardholder setting up an account with the brokerage service.

When a potential subscriber applies to the rebate program (in step 606), both systems perform various application-related processing (in step 608). In one embodiment, the card provider first approves the applicant based on criteria relevant to the card provider (e.g., by verifying the credit-worthiness of the potential subscriber). Upon approving the application, the card provider sets up a card payment account for the applicant. The card provider further communicates information pertaining to the new cardholder to the brokerage service. The brokerage service may then separately approve the applicant based on criteria relevant to the brokerage service. Further, the brokerage service may set up a brokerage account in a conventional fashion by, for instance, requesting the new cardholder to deposit sufficient funds to cover costs associated with transactions. These funds can be deposited via check, electronic funds transfer, or other means. In step 610, the card provider and brokerage service perform all necessary communication to establish a cross reference which ties the card payment account assigned by the card provider system 128 to the transaction account assigned by the brokerage service system 124.

Other applicants may have a prior affiliation with the card provider. That is, some applicants may already own one or more cards furnished by the card provider system 128, but have no previous affiliation with the brokerage service. The opposite may apply to other applicants. Namely, other applicants may have a prior affiliation with the brokerage service, but have no previous affiliation with the card provider. The formation of new rebate accounts in these two circumstances may omit elements of the above-described processing that are not required. For instance, a user having prior affiliation with the card provider system 128 may or may not require credit approval to join the rebate program, depending on the provider's policies. Similarly, a user that has a prior affiliation with the brokerage system 124 will already have an established transaction account with the brokerage system 124.

The rebate program may provide that the card provider and/or brokerage service receive a new account incentive when a new user joins the rebate program.

For instance, the brokerage service may receive $15.00 for new accounts established through the efforts of the card provider, and may receive $25.00 for new account established through the efforts of the brokerage service (e.g., for new accounts established via the brokerage service's on-line services, or established via an agent of the brokerage service).

Figure 7:
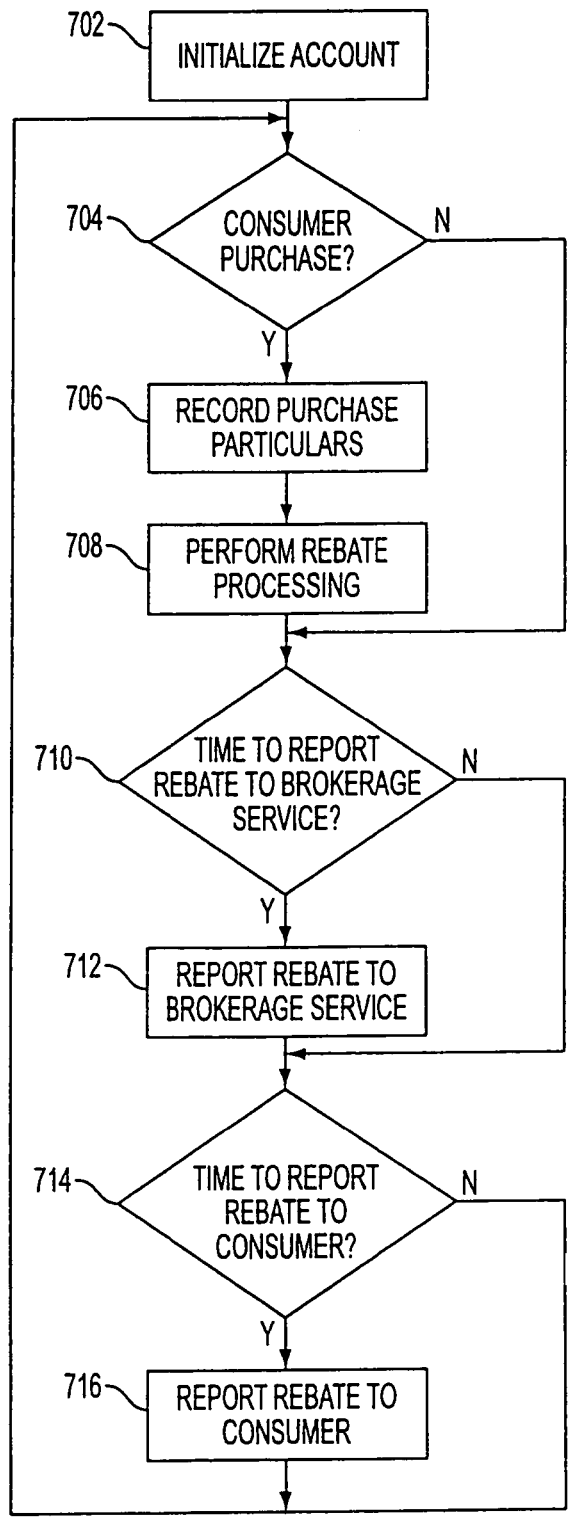
FIG. 7 shows an exemplary process for administering rebates at the card provider system of FIG. 1.

FIG. 7 outlines a procedure for administering the rebate program at the card provider system 128 once the applicant has been approved. Namely, after initializing an account in the above-described manner (in step 702), the card provider system 128 monitors purchase volumes at one of the affiliated merchant/service providers (in step 704). Then, the card provider system 128 records details of the transaction (in step 706) in a conventional manner. Thereafter, the card provider system 128 performs rebate processing (in step 708) to determine rebate information. Rebate processing may entail computing the net value of purchases in a selected time span and then determining a percentage of the net value. Providing that the cardholder just subscribed to this service, the cardholder's prior net balance will be zero (or, alternatively, may be some non-zero value if an initial amount is allocated to the cardholder upon subscribing to the rebate program).

Following rebate processing, the card provider system 128 determines whether it is time to report rebate information to the brokerage service. Typically, it is envisioned that the card provider system 128 will report rebate information to the brokerage service on a periodic basis, such monthly, bi-annually, or annually. In an alternative embodiment, the card provider system 128 may report the rebate information to the brokerage service after every purchase made by the cardholder. (However, this option may impose a heavy load on the system 100). Still other embodiments may allow other intervals designed to serve specific program needs.

The rebate information sent from the card provider to the brokerage system may comprise various information pertaining to the rebates. For instance, this information may identify various accounting data, such as the net value or percentage of purchases in a current reporting interval, the rebate allocated to the cardholder in the current reporting interval, the total rebate accrued over multiple reporting intervals, and a date on which an unvested rebate will vest (i.e., the date on which the rebate will be made available to the cardholder to apply toward brokerage fees). In one embodiment, the rebate information also includes an actual transfer of funds to the brokerage system. In an alternative embodiment, the card provider transfers funds to the brokerage system at different times than it transmits the above-described accounting data. More particularly, in one embodiment, the card provider transfers funds to the brokerage service each time it forwards rebate information to the brokerage service. Those skilled in the art will appreciate that there are many other ways to transfer data and funds between the card provider and brokerage service. In any case, funds may be transferred electronically or through some other means (e.g., by paper check, etc.).

In another embodiment, the brokerage service may completely fund the free trades. In this case, the card provider system does not transfer any funds to the brokerage service. Alternatively, the card provider system may transfer funds to the brokerage service to reimburse the brokerage service for its prior covering of costs associated with free trades.

The card provider system 128 also independently sends reports to its cardholders. These reports may be sent as written records via the mail, or may alternatively be downloaded to the cardholder in electronic form. FIG. 9 illustrates an exemplary credit card statement provided by the card provider system 128. It includes two portions, namely, a transaction details portion 902 and a rebate information portion 904. The transaction details portion 902 includes conventional information concerning transactions that have taken place in a reporting interval (typically a month). For instance, portion 902 may identify the transactions by listing their dates, transaction codes, vendor/service providers, and monetary amounts. Portion 902 may further identify the previous balance (i.e., at the end of the previous reporting interval), the new balance (i.e., at the end of the current reporting interval), minimum amount due, date on which the minimum amount is due, and net purchase amount for the current reporting interval.

The rebate information portion 904 identifies refund and free trade information. More specifically, this portion identifies the brokerage account number that will receive the benefits of the rebate, the net amount of purchases for the current reporting interval, the incremental rebate value assessed by the card provider for the current reporting interval, the net rebate value assessed by the card provider within a predetermined time-frame (e.g., within a year), and a rebate payout date (that identifies a date on which the card provider will forward the rebate information to the brokerage service).

Figure 8:
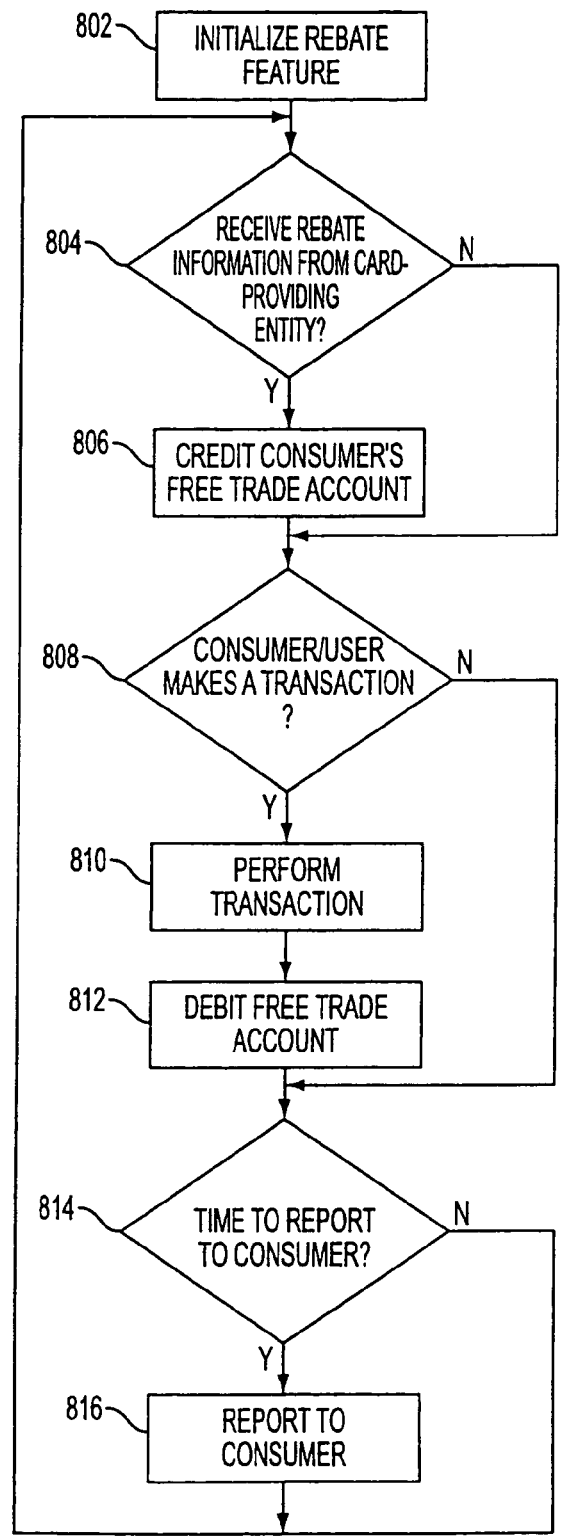
FIG. 8 shows an exemplary process for administering rebates at the brokerage system of FIG. 1.

FIG. 8 shows rebate processing performed at the brokerage system 124. The process starts when the system initializes the rebate program for a subscriber (e.g., by setting up the card account and the transaction account in the card provider system 128 and the brokerage service system 124, respectively, in the manner described with reference to FIG. 6) (in step 802). In step 804, the brokerage service determines whether the card provider has downloaded rebate information. As mentioned above, the card provider typically will download rebate information on a periodic basis, such as on an annual or bi-annual basis. If new rebate information has been received, the brokerage service proceeds by posting this information to its free trade account (in step 806). Then, in step 808, the brokerage service determines whether the cardholder (or other user) has directed the brokerage service to make a transaction. If so, the brokerage service performs the transaction (in step 810). This may entail, for instance, performing any type of asset purchase, sale, transfer, etc. Then, in step 812, the brokerage service applies the funds in the free trade account to cover a portion of the transaction (where appropriate). In one exemplary embodiment, the brokerage service specifically applies the funds in the free trade account to pay for the transaction fees assessed by the brokerage service. Hence, if the rebate fees are sufficient to pay for multiple transactions, these transactions may be regarded as "free."

Different business entities may choose to apply different algorithms to determine the amount of rebate to be applied based on the cardholder's net purchase amount. In one exemplary embodiment, the rebate is funded by both the card provider and the brokerage service. That is, the brokerage service (or the card provider) may multiply the net purchase value by a first rate to arrive at the amount of rebate that will be funded by the card provider. The brokerage service (or card provider) may further multiply the net purchase value by a second rate to arrive at the amount of rebate that will be funded by the brokerage service. The total rebate value is assessed by adding the two above-identified rebates together. For example, assume that a cardholder has made purchases totaling $3,400 in one reporting interval (e.g., in one month). A rebate funded by the card provider may comprise 0.4% of the net purchase value, or $13.60. A rebate funded by the brokerage service may comprise 0.6% of the net purchase value, or $20.40. The total rebate applied to the free trades account would be 1.0% of the net purchase amount, or $13.60+$20.40=$34.00. In an alternative embodiment, the card provider may fund the entire rebate amount. In still another alternative embodiment, the brokerage service may fund the entire amount. Of course, different rebate rates can be selected to suit particular business environments, business objectives, and reward structures. Typically, rates are smaller than 2.0%, but greater rates are possible.

In still another embodiment, the "free trades" are earned based on the number of times (e.g., frequency) that a cardholder uses his or her card. For instance, a cardholder may earn one free trade upon making fifteen purchases with his or her card. In this case, the number of free trades earned may be independent of the accrued cash value of the cardholder's purchases. In still another embodiment, free trades may be earned based on a combination of the frequency of card usage and the aggregate cash value of card purchases.

In another embodiment, the rate at which "free trades" are earned may take into account various characteristics of the cardholder and/or various attributes the cardholder's behavior. Relevant factors that can be used to accelerate or diminish the rate at which rebates are earned include: (a) length of time that the cardholder has subscribed to the services of the card provider and/or brokerage system; (b) membership in "special status" categories (e.g., gold or platinum card categories, or other categories); (c) interest-bearing balance on accounts; (d) credit rating, etc.

In step 819, the brokerage service determines whether it is time to send a report to the cardholder. In preferred embodiments, the brokerage service physically or electronically sends this report on periodic intervals, such as every month. FIG. 10 shows one exemplary report that the brokerage service may generate. It includes a transaction details portion 1002 and a rebate information portion 1004. The first portion 1002 includes conventional information concerning transactions that have taken place in a reporting interval (typically a month). For instance, this portion may identify the transaction by listing their dates, transaction types or codes, transaction details (such as the number of shares purchased, sold, transferred, etc.), and monetary amounts associated with the transactions. This portion may further identify the previous balance in the brokerage account (i.e., at the end of the previous reporting interval), the new balance (i.e., at the end of the current reporting interval), deposits made by the cardholder in the current billing interval, etc.

The second portion 1004 identifies refund information. More specifically, this portion identifies the card account that earned the rebates (e.g., by listing its account number), the date that the last rebate was received from the card provider and added to the free trades account, the value of the last rebate, the previous net value of the free trade account (i.e., at the end of a previous reporting interval), the amount that was debited from the free trades account in the current reporting interval, and the net value of the free trades account at the end of the current reporting interval.

Those skilled in the art will appreciate that FIGS. 9 and 10 show an exemplary arrangement and selection of accounting information. Different arrangements and selections of accounting information are possible to suit different business applications. For example, in alternative embodiments, the card provider and and/or brokerage service may decide to provide less complex statements compared to those shown in FIGS. 9 and 10. For instance, as to the rebate portion of the report, the card provider and/or brokerage service may opt to simply inform the cardholders of how many free trades they have earned (or will earn when their rewards vest).

The above discussion was principally framed in the exemplary context of a brokerage service having an interface which allows cardholders to directly trade and manage their financial assets. However, the principles disclosed herein apply to electronic systems where a brokerage agent (or other brokerage personnel) makes investment-related transactions on behalf of cardholders (e.g., at the direction of the cardholders). The principles disclosed herein also apply to other brokerage systems that use other means for making transactions (including various non-automated or semi-automated means for making transactions).

Generally, modifications to the embodiments described above can be made without departing from the spirit and scope of the invention, as is intended to be encompassed by the following claims and their legal equivalents.

What is claimed is:

1. A computer-implemented system for administering a reward program, comprising:
   a card provider system, including:
      a first module executed by a processor for generating reward information based on at least one purchase of goods or services using a card instrument; and
   a brokerage system, including:
      a second module executed by a processor for applying a reward, based on the reward information, to fund at least part of a transaction for securities performed by the brokerage system,
   wherein the brokerage system charges a transaction fee to perform the transaction, and wherein the second module uses the reward to fund at least part of the transaction fee.

2. A computer-implemented system for administering a reward program, comprising:
   a card provider system, including:
      a card instrument account for a cardholder that identifies purchases made by the cardholder using a card instrument;
      a first module executed by a processor for processing purchases made by the cardholder based on use of the card instrument;
      a second module executed by a processor for determining a reward information based on the purchases made using the card;
   a brokerage system, including:
      a transaction account for the cardholder that identifies transactions made by the cardholder, or on behalf of the cardholder, using the brokerage system;
      a third module executed by a processor for receiving instructions from the cardholder that directs the brokerage system to perform a transaction for securities;
      a fourth module executed by a processor for processing the transaction; and
      a fifth module executed by a processor for applying a reward to fund at least part of the transaction,
   wherein the reward is based on the reward information, wherein the brokerage system charges a transaction fee to perform the transaction, and wherein the fifth module uses the reward to fund at least part of the transaction fee.

3. The system of claim 2, wherein the second module comprises logic for determining reward information on a periodic basis as a percentage of net purchase information recorded in the card instrument account.

4. The system of claim 2, wherein the card provider system further includes a sixth module executed by a processor for transferring the reward information from the card provider system to the brokerage system.

5. The system of claim 4, wherein the sixth module transfers the reward information on a periodic basis.

6. The system of claim 2, wherein the card provider system further comprises:
   a seventh module executed by a processor for generating a card instrument report that identifies purchases made by the cardholder, and which also identifies reward information.

7. The system of claim 2, wherein the brokerage system further comprises:
   an eighth module executed by a processor for generating a transaction report that identifies transactions made by the cardholder, on behalf of a cardholder, using the brokerage system, and which also identifies reward information.

8. The system of claim 2, wherein part of the reward is funded by the card provider system, and part of the reward is funded by the brokerage system.

9. A computer-implemented card provider system for administering a reward program, comprising:
   a card provider system, including:
   a card instrument account for a cardholder that identifies purchases made by the cardholder using a card instrument;
   a first module executed by a processor for processing purchases made by the cardholder based on use of the card instrument, and for making a record of the purchases in the card instrument account;
   a second module executed by a processor for determining net purchase information based on a summation of purchase information stored in the card instrument account;
   a third module executed by a processor for determining reward information based on the net purchase information;
   a fourth module executed by a processor for transferring the reward information to a brokerage system,
   wherein the brokerage system applies a reward to fund at least part of a transaction for securities made using the brokerage system, wherein the reward is based on the reward information,
   wherein the brokerage system charges a transaction fee to perform the transaction, and the brokerage system applies the reward to fund at least part of the transaction fee.

10. A computer-implemented brokerage system for administering a reward program, comprising:
    a brokerage system, including:
    a transaction account for the cardholder that identifies transactions made by the cardholder, or on behalf of the cardholder, using the brokerage system;
    a first module executed by a processor for receiving reward information from a card provider system, the reward information based on net purchases made by a cardholder using a card instrument;
    a second module executed by a processor for receiving instructions from the cardholder, or on behalf of the cardholder, that directs the brokerage system to perform a transaction for securities;
    a third module executed by a processor for processing the transaction; and
    a fourth module executed by a processor for applying a reward to fund at least part of the transaction, wherein the reward is based on the reward information,
    wherein the brokerage system charges a transaction fee to perform the transaction, and the brokerage system applies the reward to fund at least part of the transaction fee.

11. A computer-implemented method for administering a reward program, comprising:
    generating, by a processor, reward information based on at least one purchase of goods or services using a card instrument;
    storing the reward information in a database;
    retrieving the reward information;
    applying a reward, based on the reward information, to fund at least part of a stock market transaction performed by a brokerage system and
    updating the database to reflect the updated reward information;
    wherein the brokerage system charges a transaction fee to perform the stock market transaction, and the step of applying comprises applying the reward to fund at least part of the transaction fee.

12. A method of administering a reward program, comprising:
    establishing, by a card provider system, a card instrument account for a cardholder;
    establishing, by a brokerage system, a transaction account;
    using the card provider system to process purchases made by the cardholder based on use of a card instrument and making a record of the purchases in the card instrument account;
    determining, by the card provider system, reward information based on the purchases made using the card instrument;
    receiving, by the brokerage system, instructions from the cardholder that directs the brokerage system to perform a transaction for securities;
    processing, by the brokerage system, the transaction, and making a record of the transaction in the transaction account; and
    applying, by the brokerage system, a reward to fund at least part of the transaction, wherein the reward is based on the reward information,
    wherein the brokerage system charges a transaction fee to perform the transaction, and the step of applying comprises applying the reward to fund at least part of the transaction fee.

13. The method of claim 12, wherein the card provider system determines the reward information on a periodic basis as a percentage of net purchase information recorded in the card instrument account.

14. The method of claim 12, further comprising the step of transferring the reward information from the card provider system to the brokerage system.

15. The method of claim 14, wherein the transferring step takes place on a periodic basis.

16. The method of claim 12, further comprising the steps of:
    generating, by the card provider system, a card instrument report that identifies purchases made by the cardholder, and which also identifies reward information; and
    forwarding the card instrument report to the cardholder.

17. The method of claim 12, further comprising the steps of:
    generating, by the brokerage system, a report that identifies transactions made by the cardholder, or on behalf of the cardholder, and which also identifies reward information; and forwarding the transaction report to the cardholder.

18. The method of claim 12, wherein part of the reward is funded by the card provider system, and part of the reward is funded by the brokerage system.

19. A computer-implemented method of administering a reward program, comprising:
    providing a card instrument to a cardholder and establishing a card instrument account;
    processing at least one purchase made by the cardholder based on use of the card instrument and making a record of the at least one purchase in the card instrument account;
    determining, by a processor, net purchase information based on a summation of purchase information stored in the card instrument account;
    determining reward information based on the net purchase information; and transferring the reward information to a brokerage system, wherein the brokerage system applies a reward to fund at least part of a transaction of publicly traded assets made using the brokerage system, wherein the reward is based on the reward information, wherein the brokerage system charges a transaction fee to perform the transaction of publicly traded assets, and the brokerage system applies the reward to fund at least part of the transaction fee.

20. A computer implemented method of administering a reward program, comprising:

establishing a transaction account with a brokerage system;

receiving reward information from a card provider system, the reward information determined by a processor and based on net purchases made by a cardholder using a card instrument;

receiving instructions from the cardholder that direct the brokerage system to perform a transaction for securities;

processing the transaction using the brokerage system and applying a reward to fund at least part of the transaction, wherein the reward is based on the reward information, wherein the brokerage system charges a transaction fee to perform the transaction, and the brokerage system applies the reward to fund at least part of the transaction fee.

\* \* \* \* \*